United States Patent [19]

Schopfer et al.

[11] Patent Number: 4,658,953
[45] Date of Patent: Apr. 21, 1987

[54] DEVICE FOR MOVING WORKPIECES BY MEANS OF ELECTROMAGNETIC OSCILLATIONS

[76] Inventors: Pierre-André Schopfer, Marniere 69, 2068 Hauterive; Francis Richard, deceased, late of Neuchatel; by Ofelia Richard, legal representative, Grand-Rue 10; by Michele Ducommun, legal representative, VY-D-Etra 37, both of 2000 Neuchatel, all of Switzerland

[21] Appl. No.: 707,401

[22] Filed: Mar. 1, 1985

[30] Foreign Application Priority Data

Mar. 5, 1984 [CH] Switzerland .......................... 1075/84

[51] Int. Cl.⁴ ............................................ B65G 27/02
[52] U.S. Cl. ..................................... 198/757; 198/769
[58] Field of Search ....................... 198/769, 756, 757; 204/198, 222

[56] References Cited

U.S. PATENT DOCUMENTS

| Re. 24,281 | 2/1957 | Jones et al. | 198/756 |
| 2,760,504 | 8/1956 | Spurlin | 198/756 |
| 2,845,168 | 7/1958 | Smith et al. | 198/769 |
| 3,397,126 | 8/1968 | Gilbert | 204/222 |

Primary Examiner—Joseph E. Valenza
Attorney, Agent, or Firm—Bacon & Thomas

[57] ABSTRACT

A device for moving workpieces, particularly in surface treatment plants, including a receptacle supported below an electromagnetic oscillating motor by an arbor for containing the workpieces, whereby oscillatory motions are imparted to the receptacle upon energization of the motor.

7 Claims, 6 Drawing Figures

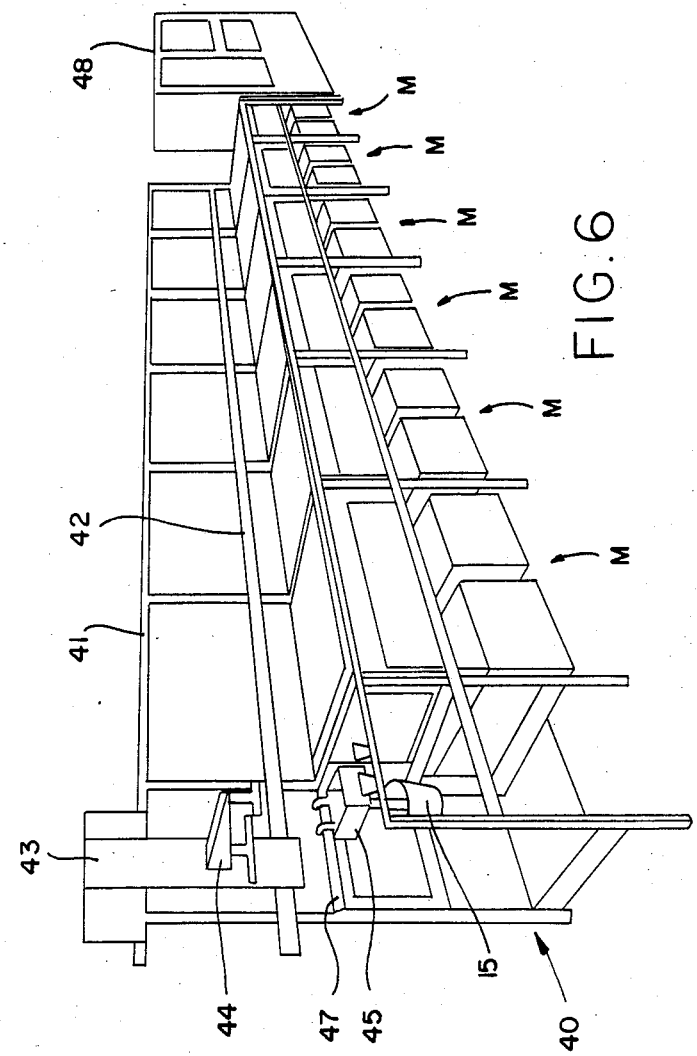

DEVICE FOR MOVING WORKPIECES BY MEANS OF ELECTROMAGNETIC OSCILLATIONS

BACKGROUND OF THE INVENTION

1. Field of the Invention

This invention concerns a device for moving workpieces in a receptacle or trough on an inclined track by means of rotative vibrations communicated to the receptacle by an electromagnetic motor.

2. Description of the Prior Art

Usually called vibrators, such devices are commonly used in industry, for example as a means of feeding machine-tools with workpieces, which are preferably, but not exclusively, of small dimensions. The workpieces at the bottom of the receptacle move up the inclined track, which is generally helicoidal, until they reach the work-station on the machine, by virtue of the vibrations imparted to the receptacle by the vibrator.

The principal application, though not the only one, envisaged for the device according to the invention, which will be referred to below as the "oscillator", essentially concerns surface-treatment plants. The oscillator, which comprises a receptacle and a motor, then has the function of mixing the workpieces which have been placed in the receptacle. When they have moved up the inclined track, these workpieces fall back to the bottom of the receptacle and the same cycle recommences after a few moments. Thus, this device is an advantageous substitute for the mixing-barrel which is a familiar feature of conventional electroplating-plants, since it ensures more regular stirring.

Essentially, a surface-treatment plant comprises one or more tanks containing the necessary baths, a receptacle in which the workpieces are placed for treatment, means for renewing the baths in the tanks, and lastly, if required, means for transferring the receptacle from one tank to another.

The familiar oscillators which are used in plants of this type are so constructed that the receptacle is placed above the motor. This is the case, for example, in the single-tank electroplating-plant which is described in patent CH No. 594072. In this construction, the oscillator is solid with the tank and is so disposed that the receptacle, placed centrally inside the tank, comes above the motor, which is situated on the outside. The transmission of movement from the motor to the receptacle is obtained by means of a shaft passing through the wall of the tank. It is obvious that this construction involves a problem of watertightness, which may be difficult to solve when corrosive liquids are used, at the point where the shaft passes through the wall of the tank. Moreover, the rigid junction between the oscillator and the tank limits the possibilities of using the plant.

In the case of a multitank plant, each tank has to be provided, in a construction of this type, with a separate oscillator of its own. This, of course, is a costly and hardly practical solution, for each transfer of workpieces will make it necessary to detach the receptacle from the motor.

For multitank plants, it has been proposed to provide the oscillator as an autonomous unit which could be moved by appropriate means from one tank to another in the course of the cycle of treatment. Despite its interest, however, this proposal has never been applied in practice, because the position of the receptacle above the motor in conventional oscillators is hardly practical for this purpose. Indeed, this type of oscillator takes up a great deal of room inside the tank and makes it necessary to protect the motor effectively from the liquid, in which it will be immersed at the same time as the receptacle.

SUMMARY OF THE INVENTION

The object of the present invention is to provide an oscillator that is free from the disadvantages of known devices of this type.

To this end, the oscillator according to the invention comprises an inclined track which can take the workpieces to be treated, an oscillating electromagnetic motor, a shaft connecting the receptacle to the motor, means for holding the oscillator, means for fitting the oscillator, and electric contact-terminals for the current-feed to the motor. An important aspect of the invention resides in the fact that the receptacle is placed below the motor.

A first advantage of the oscillator according to the invention is that it is of simple construction and is watertight.

A second advantage of the oscillator according to the invention is that it is particularly suitable for use in multitank surface-treatment plants.

Other characteristics and advantages of the invention will appear from the following description, which accompanies the attached drawings and gives an explanatory, though in no wise limitative, account of one advantageous form of construction of such an oscillator, as well as a surface-treatment plant which is particularly suitable for the use of the oscillator according to the invention. In these drawings, the same references denote the same parts.

BRIEF DESCRIPTION OF THE DRAWINGS

FIG. 6 is a perspective view of a surface-treatment plant formed of several modules and using oscillators according to the invention.

DETAILED DESCRIPTION OF THE PREFERRED EMBODIMENTS

Figure 1:
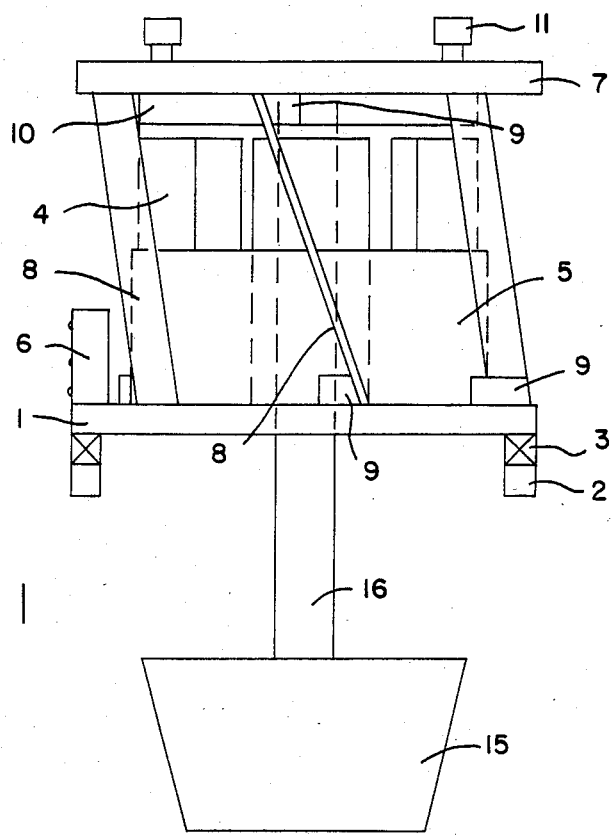
FIG. 1 is an elevational view of an oscillator according to a preferred embodiment of the invention.
Figure 2:
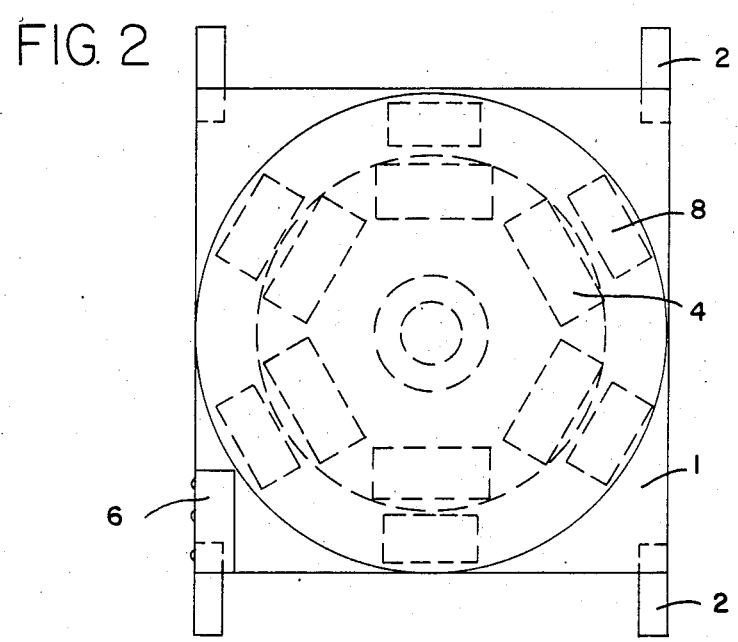
FIG. 2 is a plan-view of the oscillator of FIG. 1.

FIGS. 1 and 2 are, respectively, an elevation and a plan-view of one form of execution of the oscillator according to the invention. It comprises a solid, square base-plate 1, made of magnetic material. When the oscillator is in operation, this base-plate is in a horizontal position. Two setting-rails 2 are connected to the base-plate 1 by means of elastic supports 3, which make it possible to damp the vibrations of the oscillator. The setting-rails 2, or any other similar device such as a hook, make it possible to place the oscillator above a tank, on a frame which is provided for the purpose and is solid with the plant. On the base-plate 1, perpendicular to it and on the side opposite to the setting-rails 2, preferably six coils 4 are fixed by means of a coil-support 5. Each coil is wound round a magnetic core, which is not shown in the drawings; its length is equal to that of the coil. The number of coils must be at least three. The coils are fed with current from an electric distribution-box 6, which is fixed on the base-plate 1 and is fitted with contact-terminals.

Above the coils 4 is fitted a circular top plate 7, which is made of a light-weight material, such as aluminum. This plate is made solid with the base-plate 1 by means of six identical spring-blades 8. Each spring-blade is fixed obliquely to each of the plates 1 and 7 by means of a bracket 9. The top plate 7 then comes into a position parallel to the base-plate 1. A magnetic armature 10, fixed opposite to the coils 4 on the top plate 7, permits the closing of the magnetic circuit formed by the cores of the coils 4 and the base-plate 1. The length of the spring-blades 8 is chosen in such a way that a narrow space, called the air-gap, is left between the coils 4 and the magnetic armature 10, enabling the top plate 7 to make rotary and translatory movements compatible with the linkages imposed by the spring-blades 8. The top plate 7 is also fitted, on the side opposite to the magnetic armature 10, with hooks 11, enabling an outside arm, which is not shown in the drawings, to grip and convey the oscillator.

The elements 1 to 11 described above, together with their fittings, form the motor of the oscillator. A receptacle 15 is fixed below this motor by means of an arbor 16, which is fixed to the center of the top plate 7. The receptacle has an inclined track, which is not shown in the drawings, and is made preferably of a transparent plastic material such as polyvinyl, so that the workpieces inside it can be seen.

The oscillator works as follows. When the same current flows through the coils 4, the result is an attractive force between the cores of the coils and the magnetic armature 10. Because of the action of the spring-blades 8, this force causes a vertical movement of translation and rotation of the arbor 16 of the top plate 7 in relation to the base-plate 1, which is maintained motionless. This movement is, of course, transmitted to the receptacle 15. If the current flowing through the coils is variable and periodic, the receptacle will likewise be given a periodic oscillating movement. If the form, intensity, and frequency of the current are appropriately chosen, the receptacle 15 will then start moving in such a way that the workpieces will climb up the inclined track and undergo the mixing process.

After testing, it has been found that the mixing of workpieces can be greatly improved if the receptacle is given a more complex movement than that which has just been described, the arbor 16 always remaining parallel to itself. This can be obtained by dividing the coils into a certain number of groups and then exciting each group of coils by means of a different variable current. In the extreme case, a group may consist of a single coil only. An interesting solution consists in forming a group with two contiguous coils which will give three distinct groups in the case of the oscillator described here. When the groups are excited periodically in such a way that, at a given moment, current flows only in a single group, the arbor 16, in addition to the movement which has already been described, will also have a turning movement round a point which is situated approximately at the center of the top plate 7. The receptacle 15 will then be subjected to the same movement, which will improve the mixing of the workpieces and their movement up the track.

Without departing from the principle of the invention, one can of course use other forms of construction of the oscillator than the one that has been given by way of an example.

An example of the use of the oscillator according to the invention in a surface-treatment plant will now be given in order to demonstrate, in particular, the advantage which can be derived from the position of the receptacle underneath the motor.

Figure 3:
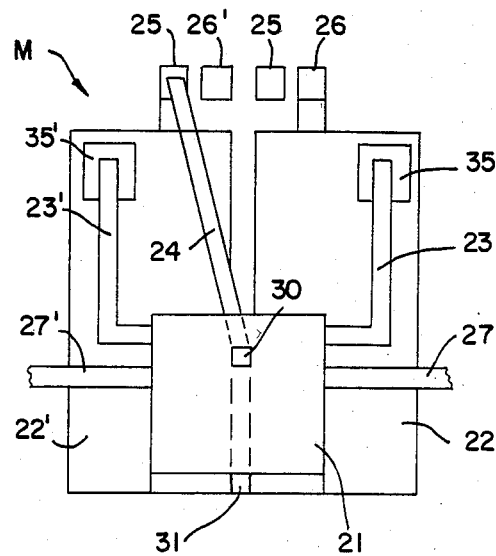
FIG. 3 is a plan-view of a tank with two reservoirs, the whole forming a module for use in the construction of a surface-treatment plant.
Figure 4:
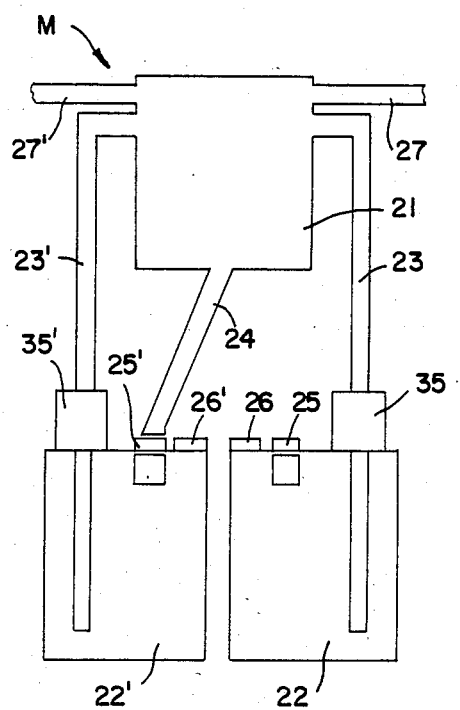
FIG. 4 is a sectional front view of the module shown in FIG. 3.
Figure 5:
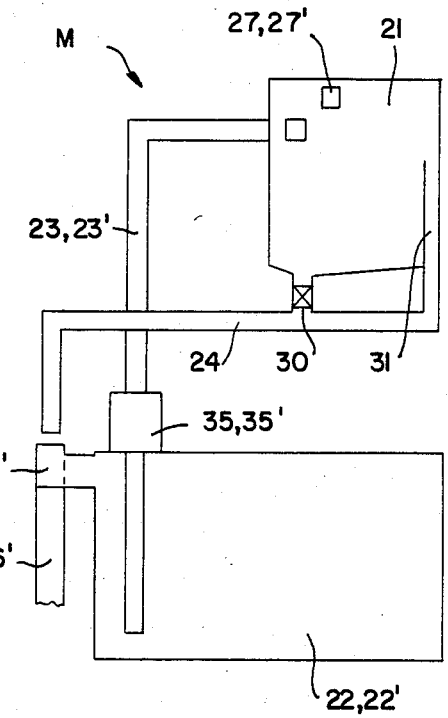
FIG. 5 is a sectional side view of the module shown in FIG. 3.

The plant comprises a certain number of modules M, and one form of execution of such a module is shown in FIGS. 3 to 5. Each of the modules M comprises a tank 21, two reservoirs 22 and 22' (though their number might be greater), two filling-pipes 23 and 23' connecting the lower part of each reservoir to the upper part of the tank 21, a mobile pipe 24 connecting the lower part of the tank 21 either to an emptying-pipe 25 or 25', situated at the top of each reservoir 22, 22' b or to a discharge pipe 26 or 26', and lastly two supplypipes 27 and 27' (though their number might be greater), leading into the tank 21 above the filling-pipes 23 and 23'.

In its open position, an emptying-gate 30 makes it possible to connect the bottom of the tank 21 with the mobile pipe 24, to which is also connected an overflow-pipe 31 fixed inside the tank 21. Each of the filling-pipes 23 and 23' contains a pump 35, 35', and the movement of one end of the mobile pipe 24, bringing it opposite to one of the emptying pipes 25, 25', or to one of the discharge-pipes 26, 26', is obtained by means of a control-device which is not shown in the drawings.

All the elements are held together by means of a framework which is not shown in the drawings: they are fixed to it in such a way that the tank 21 is situated above the reservoirs 22 and 22', the emptying-pipes 25 and 25', and the discharge pipes 26 and 26'. Lastly, all the elements inside the module are enclosed by protecting-sheets which are solid with the framework.

With this construction of the module, the transfer of a treatment-bath from the reservoir 22 to the tank 21, the emptying-gate 30 being closed, is obtained by a forced circulation of the liquid through the action of the pump 35. For its part, a rinsing-bath is brought into the tank 21 by a pressure-pipe 27, for example a waterpipe, its flow being regulated by a gate which is not shown in the drawings. In this construction, the return of the treatment-bath from the tank 21 into the reservoir 22 is obtained by gravity, after the end of the mobile pipe 24 has been placed opposite to the emptying-pipe 25, the emptying-gate 30 being open. Similarly, the rinsing-bath is transferred by gravity into the discharge pipe 26 by means of the mobile pipe 24, which is placed in an adequate position, the circulation of the baths between the tank 21 and the reservoir 22', the emptying-pipe 25', the discharge-pipe 26' or the inlet-pipe 27' is identical with that which has been described above.

During the active phases of the process, when the workpieces are in a tank, it is advantageous to make the baths circulate continuously; they will then leave the tank 21 by way of the overflow-pipe 31 and then enter the emptying-pipe 25 and the discharge pipe 26.

Different arrangements of the elements in relation to one another, as compared with that which has been described, might of course be adopted without departing from the principle of the present invention. For instance, the tank 21 might be situated at the same level as the reservoirs 22 and 22', or even lower. Similarly, pumps might be used in all the pipes in order to increase the flow of liquid. The mobile pipe 24 might also be replaced by fixed pipes with a gate in each one, connecting the bottom of the tank to the emptying-pipes 25 and 25' and the discharge-pipes 26 and 26'.

FIG. 6 shows a complete plant according to the invention. In this example, it is composed of six modules M as described above, all of them identical except perhaps as far as the number of reservoirs 22 and 22' is concerned. A frame 40, surrounding the modules M and holding them together, supports two horizontal guide-rails 41 and 42 on the rear part of the plant, where the emptying-pipes 25 and the discharge-pipes 26 of the modules are situated. On these rails, placed above the tanks 21 of the modules M, there is a carriage 43, which supports a mobile arm 44, made to slide on this carriage vertically. In its lower position, the arm 44 can grip, by means of the hooks 11, a support 45, to which is fixed an oscillator as described above and of which only the receptacle 15 is visible. Of course, the support 45 contains all the current-leads required for the working of the oscillator. When the support 45 is not engaged with the arm 44, it rests on a horizontal hooking-rail 47 which, like the guide-rails 41 and 42, extends along the entire plant.

The workpieces are placed in the receptacle 15 when it is disengaged, away from the modules, in a loading-position provided for this purpose on the frame 40. Once the workpieces are in position, the arm 44 can lift the receptacle 15, coming into a high position on the carriage 43. A translation of this carriage along the guide-rails 41 and 42 makes it possible to bring the receptacle 15 above the selected module M. The position of the receptacle 15 in relation to the support 45 is such that the return of the arm 24 to the low position brings it to the required place inside the tank 21 of the module M. The support 45 remains in that position, resting on the hooking-rail 47 and maintaining the motor of the oscillator outside the bath in the tank 21. The arm 44 can then leave the support 45 and return to its initial position in order to grip another oscillator, fixed to a support 45, which might have been loaded in the meantime, or to transfer an oscillator from one tank to another.

The circulation of the baths in the modules M and the movements of the carriage 43 and of the arm 44 are obtained by means of well-known devices which are not shown in the drawings. These devices are operated from a control-cabinet 48, either by hand or by means of a memory-device such as a perforated or magnetic tape.

It is claimed:

1. A device which is transportable to and from at least one work station for moving workpieces by electromagnetic oscillations comprising:
    (a) a base plate formed of magnetic material and including upper and lower faces;
    (b) a top plate spaced from the base plate and including upper and lower faces;
    (c) a plurality of elongate spring blades connected at their opposite ends to the base and top plates, and disposed obliquely with respect to the plates for supporting the top plate above the base plate during operation of the device;
    (d) a magnetic armature carried by the lower face of the top plate;
    (e) a plurality of magnetic cores supported on the upper face of the base plate in a circular array and extending toward the magnetic armature but terminating short thereof to define an air gap between the ends of the magnetic cores and the magnetic armature;
    (f) a coil wound on each magnetic core, with each magnetic core and its associated coil being electrically independent of the remaining magnetic cores and coils;
    (g) an elongate arbor having one end secured to the top plate and extending downwardly through the base plate;
    (h) a receptacle supported on the other end of the arbor below the base plate when the device is disposed in a position of operation; and
    (i) means for energizing the coils for imparting oscillatory motion to the top plate, arbor and receptacle whereby the base plate is maintained substantially motionless during such energization.

2. The device of claim 1 wherein the receptacle includes an inclined track.

3. The device of claim 1 further including means carried by the lower face of the base plate for supporting the motor and damping vibrations.

4. The device of claim 1 further including means carried by the top plate for supporting the device during transport to and from at least one work station.

5. The device of claim 1 wherein the motor includes at least three magnetic cores.

6. The device of claim 5 wherein the motor includes six magnetic cores.

7. A method of moving workpieces contained within a receptacle by an electromagnetic oscillating motor comprising the steps of:
    (a) providing an electromagnetic oscillating motor defined in part by a base plate formed of magnetic material, a top plate spaced from the base plate, a plurality of elongate spring blades for supporting the top plate above the base plate during operation of the motor, a magnetic armature carried by the top plate, a plurality of magnetic cores supported on the base plate in a circular array and extending toward the magnetic armature but terminating short thereof to define an air gap between the ends of the magnetic cores and the magnetic armature, and a coil wound on each magnetic core, wherein each magnetic core and its associated coil are electrically independent of the remaining magnetic cores and coils;
    (b) securing one end of an elongate arbor approximately the center of the top plate whereby the arbor extends downwardly through the base plate;
    (c) supporting a receptacle on the other end of the arbor below the base plate; and
    (d) periodically exciting the individual coil groups with electrical current to impart a turning movement to the arbor about a point situated approximately at the center of the top plate.

* * * * *